(12) United States Patent
Tibble et al.

(10) Patent No.: US 9,507,694 B1
(45) Date of Patent: Nov. 29, 2016

(54) ARTIFACT NORMALIZATION

(71) Applicant: SEMMLE LIMITED, Oxford (GB)

(72) Inventors: Julian Tibble, Oxford (GB); Pavel Avgustinov, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 14/928,776

(22) Filed: Oct. 30, 2015

(51) Int. Cl.
*G06F 9/44* (2006.01)
*G06F 11/36* (2006.01)

(52) U.S. Cl.
CPC ......... *G06F 11/3672* (2013.01); *G06F 11/362* (2013.01)

(58) Field of Classification Search
None
See application file for complete search history.

(56) References Cited

U.S. PATENT DOCUMENTS

| | | | | |
|---|---|---|---|---|
| 4,987,531 A * | 1/1991 | Nishikado | ......... | G06F 17/30067 |
| 5,339,435 A * | 8/1994 | Lubkin | ...................... | G06F 8/71 |
| | | | | 717/121 |
| 6,862,601 B2 * | 3/2005 | Doney | .............. | G06F 17/30076 |
| 7,464,386 B2 * | 12/2008 | Millington | ........ | G06F 17/30867 |
| | | | | 717/120 |
| 7,665,098 B2 * | 2/2010 | Kavalam | ............. | G06F 11/3476 |
| | | | | 707/769 |
| 8,126,944 B2 * | 2/2012 | McArdle | .......... | G06F 17/30067 |
| | | | | 707/828 |
| 8,209,672 B2 * | 6/2012 | Ivanov | ..................... | G06F 8/30 |
| | | | | 717/120 |
| 8,438,610 B2 * | 5/2013 | Sabin | ............... | H04L 29/12594 |
| | | | | 709/223 |
| 8,667,479 B2 * | 3/2014 | Johnsson | .................. | G06F 8/61 |
| | | | | 717/122 |
| 9,229,748 B2 * | 1/2016 | Larimore | ................ | G06F 17/30 |
| 2003/0051230 A1 * | 3/2003 | Molchanov | ............... | G06F 8/71 |
| | | | | 717/120 |
| 2005/0138606 A1 * | 6/2005 | Basu | ........................ | G06F 8/74 |
| | | | | 717/136 |
| 2005/0262411 A1 * | 11/2005 | Vertes | ................... | G06F 11/203 |
| | | | | 714/741 |
| 2005/0283760 A1 * | 12/2005 | Miller | ....................... | G06F 8/20 |
| | | | | 717/120 |
| 2005/0283766 A1 * | 12/2005 | Miller | ....................... | G06F 8/20 |
| | | | | 717/120 |
| 2006/0259949 A1 * | 11/2006 | Schaefer | .......... | G06F 17/30082 |
| | | | | 726/1 |
| 2007/0130370 A1 * | 6/2007 | Akaezuwa | ........ | G06F 17/30091 |
| | | | | 710/1 |
| 2007/0214411 A1 * | 9/2007 | Puthiyaveettil | ....... | G06F 17/227 |
| | | | | 715/234 |
| 2008/0294703 A1 * | 11/2008 | Craft | .................. | G06F 17/30067 |
| 2013/0332899 A1 * | 12/2013 | Stewart | ............... | G06F 9/44505 |
| | | | | 717/121 |
| 2014/0157235 A1 * | 6/2014 | Bird | ....................... | G06F 11/008 |
| | | | | 717/122 |
| 2014/0229915 A1 * | 8/2014 | Bates | .................. | G06F 11/3624 |
| | | | | 717/122 |
| 2015/0007006 A1 * | 1/2015 | Kaminsky | ........... | G06F 17/3089 |
| | | | | 715/205 |

OTHER PUBLICATIONS

Robillard, Murphy, "Static Analysis to support the evolution of exception structure in object-oriented systems"; ACM 2003; [retrieved on Aug. 8, 2016]; Retrieved from Internet <URL:http://dl.acm.org/citation.cfm?id=941569>; pp. 191-122.*

Zhang, Lu, "XQuery Query Over XML Update Streams"; 2010 IEEE; [retrieved on Aug. 8, 2016]; Retrieved from Internet <URL:http://dl.acm.org/citation.cfm?id=941569>; pp. 191-122.*

(Continued)

*Primary Examiner* — Xi D Chen
(74) *Attorney, Agent, or Firm* — Fish & Richardson P.C.

(57) ABSTRACT

Methods, systems, and apparatus, including computer programs encoded on computer storage media, for generating normalized analysis artifacts for a source code base. One of the methods includes receiving a request to perform an analysis of a collection of source code files in a particular file system, wherein each source code file in the particular file system has a respective associated original file path. One or more normalized analysis artifacts are generated for the collection of source code files, including applying a file path transformation function to the original file path of each source code file referenced by the analysis artifacts to generate a normalized file path for the source code file, wherein each reference in the normalized analysis artifacts to a particular source code file uses the normalized file path for the particular source code file instead of the original file path for the particular source code file.

37 Claims, 4 Drawing Sheets

(56) References Cited

OTHER PUBLICATIONS

'mathworks.com' [online]. "Specify File Names: Construct valid path and file names," copyright 1994-2016, [retrieved on Feb. 22, 2016]. Retrieved from the Internet at URL: http://www.mathworks.com/help/matlab/matlab_env/specify-file-names.html?s_tid=gn_loc_drop&requestedDomain=www.mathworks.com, 3 pages.

'microsoft.com' [online]. "Naming files, paths and namespaces," Oct. 2008, [retrieved on Feb. 22, 2016]. Retrieved from the Internet at URL: https://msdn.microsoft.com/en-us/library/aa365247(VS.85).aspx, 19 pages.

'opengroup.org' [online]. "The Open Group base specifications Issue 6," IEEE Std 1003.1, 2004 edition, copyright 2001-2004 [retrieved on Feb. 22, 2016]. Retrieved from the Internet at URL: http://pubs.opengroup.org/onlinepubs/009695399/basedefs/xbd_chap04.html#tag_04_11, 10 pages.

'oracle.com' [online]. "What is a path? (and other file system facts)," copyright 1995, 2015, [retrieved on Feb. 22, 2016]. Retrieved from the Internet at URL: https://docs.oracle.com/javase/tutorial/essential/io/path.html, 2 pages.

'Wikipedia.org' [online]. "Path (computing)," last modified Feb. 2016, [retrieved on Feb. 22, 2016]. Retrieved from the Internet at URL: https://en.wikipedia.org/wiki/Path_(computing)#Absolute_and_relative_paths, 6 pages.

\* cited by examiner

ARTIFACT NORMALIZATION

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot is a view of the source code of files of the code base as the files existed at a particular point in time. A snapshot may be thought of as including all the source code as of the point in time.

Source code in a code base is typically compiled in a build environment by a build system. The build environment includes an operating system; a file system; executable files, e.g., compilers; environment variables, e.g., variables that indicate a path to file system directories that contain source code files or executable files; and other configuration files for building source code in the code base.

Some build systems include multiple computers, which may be connected over a network. Build systems having multiple computers will be referred to as distributed build systems, which perform distributed builds. In a distributed build, the multiple computers of the distributed build system cooperate to build all of the source code files in a project.

A static analysis system generates analysis artifacts for source code files in a build system. An analysis artifact is a collection of data generated by a source code extractor or another static analysis tool, as opposed to an object file or an executable generated by the build utility or a compiler of a build system. Analysis artifacts can be stored as files of a file system or stored in any appropriate data repository, e.g., as records in a database.

The analysis artifacts generated by a static analysis system typically include various properties of the source code in the source code files, e.g., information that describes relationships between source code constructs in the snapshot, e.g., between variables, functions, and classes. An analysis artifact can also include information identifying various characteristic segments of source code having a particular attribute. Such attributes associated with segments of source code may be used for in multiple ways. For example, one kind of attribute may indicate how many lines of code are represented by associated segments of code. Another kind of attribute may measure the number of function points, or the cyclomatic complexity, or many other metrics familiar to those skilled in the art, associating each source segment with its value of the metric under consideration. Yet another kind of attribute may consist of text describing a problem or issue discovered within a particular segment of source code. Finally, an attribute may be used to provide navigational information, by, for example, associating each code segment that corresponds to a use of a variable or function with the definition of the corresponding variable or function, thus allowing a developer to easily view the definition. Many other kinds of attributes are possible.

The analysis artifacts generated in this manner can then be presented to the user by the static analysis system, optionally in an aggregated fashion. The static analysis system may use the analysis artifacts to display overarching metrics like the number of lines of code or function points that exist in the code base. The static system may also display warnings to the user, such warnings pertaining to particular segments of source code, or display statistics about the number and kind of warnings that have been detected. The static analysis system may also provide an interface for navigating the code base using the information contained in the analysis artifacts.

The files in a build system are typically identified, and distinguished from one another, by file paths. In some situations, a static analysis system might generate multiple analysis artifacts for the same build system file, e.g., when the file occurs at multiple file paths because the build system copied it, or because the build system is distributed and different file paths are used on different computers which form part of the distributed build system. In such a situation, the static analysis system performs redundant work. Furthermore, the identical analysis artifacts may result in the properties in the artifacts to be double counted because the analysis artifacts were generated for files have differing file paths. This can result in a database populated with properties of the analysis artifacts to double count properties of some files in the build system. Worse, where the analysis artifacts provide information about navigation or other attributes that pertain to multiple files, the different file paths may cause such attributes to be misinterpreted or displayed incorrectly. For example, a developer attempting to navigate to the definition of a variable may be shown an error page instead.

SUMMARY

This specification describes how a static analysis system can normalize file paths when generating analysis artifacts for source code files in a build system. Normalization allows, for example, a static analysis system to generate a set of analysis artifacts that avoids redundant processing and duplicate counting, even when the artifacts are generated for files on different machines or files in different working directories. Therefore, the system can display to the user information derived from the set of analysis artifacts in the same way as it would have been had the analysis artifacts been generated from files located in a same working directory on a single machine.

Particular embodiments of the subject matter described in this specification can be implemented so as to realize one or more of the following advantages. A static analysis system implementing artifact normalization benefits from increased computational efficiency and performance compared to standard static analysis systems. Further, a static analysis system implementing artifact normalization facilitates easier comparability of projects, leading to, for example, improved project management and control. A static analysis system implementing artifact normalization may increase the accuracy of the analysis, decrease the number of errors in the analysis, and decrease the amount of computational storage required in the system. Further, analysis artifacts produced by a static analysis system implementing artifact normalization may be correctly combined and unified for presentation to the user even when generated by different machines in a distributed build system or over incremental analysis runs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A static analysis system can automatically normalize original file paths in analysis artifacts such that the analysis artifacts for the same project that are generated on different machines or in different working directories can be combined coherently. These normalized analysis artifacts containing normalized file paths can be combined to produce the same unified and aggregated information as would be obtained by analysis artifacts that are generated in the same working directory on a single machine.

Figure 1:
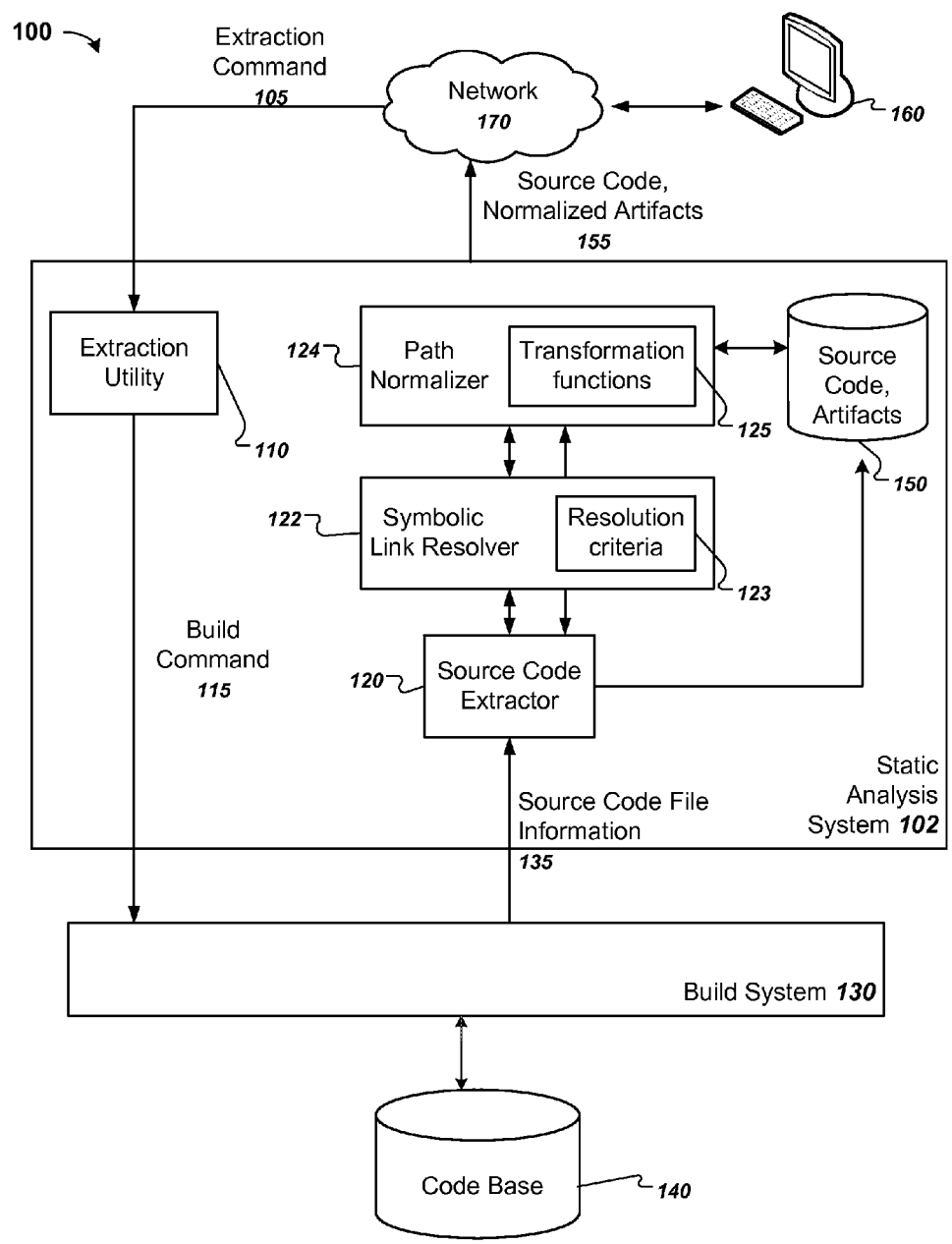
FIG. 1 illustrates an example system.

FIG. 1 illustrates an example system. The system 100 includes a user device 160 in communication with a static analysis system 102 over a network, 170, which can be any appropriate communications network. The system 100 is an example of a system in which a static analysis system 102 extracts source code processed by a build system 130.

The static analysis system 102 includes an extraction utility 110, a source code extractor 120, a symbolic link resolver 122, an artifact normalizer 124 and a collection of source code and analysis artifacts 150. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

The static analysis system 102 is in communication with a build system 130. The build system 130 can be installed on a single computer or on multiple computers. For example, the build system 130 can be a distributed build system including thousands of computers that cooperate to build code in the code base 140 in parallel. The static analysis system 102 and the build system 130 can be installed on different computing devices that are in communication with one another, e.g., using the network 170, or the static analysis system 102 and the build system 130 can be installed on a same computing device.

The example build system 130 builds source code in a code base 140, e.g., using a build utility and one or more compilers, which can be conventional components for building and compiling source code. For example, the build system 130 can use the "make" utility for Linux and Unix systems or a batch script that coordinates compiling of source code in the code base 140. The example build system 130 is only one type of system for which artifact normalization can be performed. The same techniques described in this specification can also be applied to normalize artifacts for other systems that do not compile source code. In particular, the techniques described in this specification are also applicable to static analysis of interpreted languages such as Python or JavaScript that do not use a compiler at all.

A user of the user device 160 can provide an extraction command 105 to the extraction utility 110 of the static analysis system 102. The extraction command 105 is a request to extract precisely the source code that the compiler 134 of the build system 130 is compiling.

The extraction utility 110 provides a build command 115 to the build system 130, which causes the build system 130 to perform a build of the code base 140. In performing a build of the code base 140, the build system 130 will invoke a compiler to compile source code files. The static analysis system 102 can instrument the build system 130, which causes the build system 130 to provide source code file information 135 to the source code extractor 102 whenever a source code file is compiled by the build system 130. The source code file information 135 generally specifies the location of a source code file or the source code itself contained in a source code file. Suitable techniques for instrumenting a build system are described in more detail in U.S. Pat. No. 9,110,737, which is herein incorporated by reference.

The source code extractor 120 uses the source code file information 135 to access precisely the source code that will be compiled by the build system 130. The source code extractor 120 uses the accessed source code to generate a normalized analysis artifact representing the properties of the source code.

Each analysis artifact generated by the source code extractor 120 will reference one or more source code files in the code base 140. To generate a normalized analysis artifact, the source code extractor 120 will normalize the original file paths of all source code files referenced in the analysis artifact.

The source code extractor 120 may first resolve symbolic links in the original file paths using a symbolic link resolver 122. The symbolic link resolver 122 uses one or more user-specified resolution criteria 123. The symbolic link resolver 122 then provides the resolved file path to a path normalizer 124 of the static analysis system 102.

The path normalizer 124 normalizes the file path according to one or more user-specified path transformation functions 125. The path normalizer 124 provides the normalized file path to the source code extractor 120 of the static analysis system 102.

The source code extractor 120 can then generate one or more normalized analysis artifacts that include information about the properties of the source code file specified by the source code file information 135. The normalized analysis artifacts generated by the source code extractor 120 will reference each source code file by its normalized file path.

The source code extractor 120 can then store the extracted source code and normalized analysis artifacts 155 in a collection of source code and analysis artifacts 150. The source code can be stored in its original text form or in an intermediate representation. Additionally, the source code extractor 120 can provide the source code and analysis artifacts 155 back to the user device 160 over the network 170.

Figure 2:
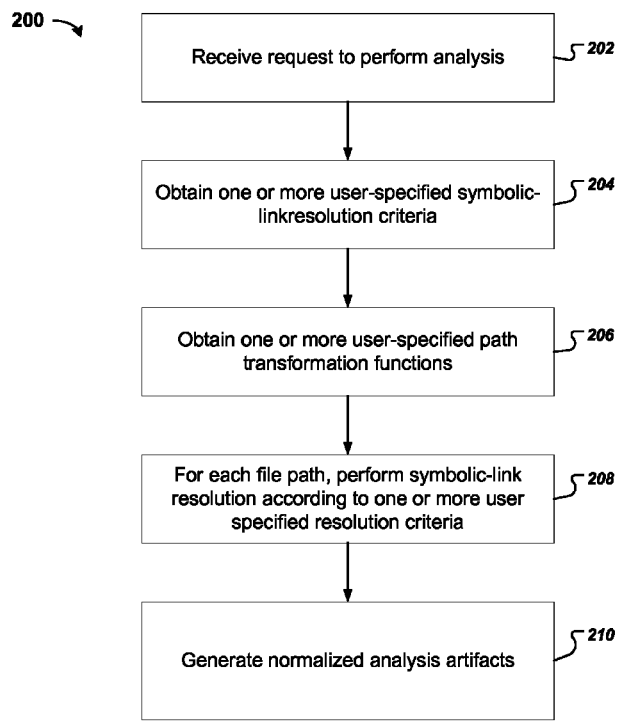
FIG. 2 is a flowchart of an example process for generating normalized analysis artifacts.

FIG. 2 is a flowchart of an example process 200 for generating normalized analysis artifacts. In general, a system will use normalized file paths within analysis artifacts so that a collection of analysis artifacts can be correctly combined. The process 200 can be performed by a static analysis system, e.g., the static analysis system 102 of FIG. 1. The process will be described as being performed by an appropriately programmed system of one or more computers.

The system receives a request to perform an analysis of a collection of source code files (202). There are a variety of analysis situations in which normalizing file paths can be beneficial. In general, normalizing file paths can be beneficial whenever it is possible for an analysis artifact to contain paths representing files that might be encountered at different original file paths. For example, in a distributed build, a first machine might generate a first analysis artifact for a first file, and a second machine might generate a second analysis artifact for a second file, and the first file might reference the second file. In this situation, the respective machines will encounter the files at different original file paths. Thus, it will be beneficial to generate normalized artifacts for these files so that the artifacts generated on the different machines can be combined.

Common situations where generating normalized artifacts is beneficial include when portions of the code base are encountered in a different working build directories, when portions of the code base are analyzed over multiple analysis runs, and when portions of the code base are encountered on multiple different machines.

For example, the request may be a request to perform an incremental analysis of the collection of source code files, in which analysis artifacts are generated in a new working directory only for source code files that have changed since a previous analysis. The newly generated incremental analysis artifacts in the new working directory may contain references to a same file referenced by previously generated analysis artifacts in a different working directory. Without using normalized file paths, the different references to the same file in the newly generated analysis artifacts would result in the newly generated analysis artifacts being incompatible with the previously generated analysis artifacts. Thus, these artifacts could not be correctly combined to yield accurate attributes of the code base. For example, the artifacts could not be correctly combined to generate source code attributes for source code files analyzed during the current analysis.

Another example of artifacts having multiple different references to a same portion of the code base arises when multiple different machines are used to perform a build and a corresponding analysis, e.g., in the case of a distributed build system. In addition, multiple different projects may make use of a same library file that occurs in multiple different locations.

As an illustrative example of what can occur when the system does not use normalized file paths, the system may receive a request to perform an analysis of a project including two files, foo.c and common.h, in which the analysis includes determining the number of lines of source code in the project. The system can analyze the project in the directory/working/directory/one, and produce a first analysis artifact having the following information:

ANALYSIS ARTIFACT 1
file1=@"/working/directory/one/foo.c"
numlines(#file1, 500)
file2=@"/working/directory/one/common.h"
numlines(#file2, 1000)

The first line defines an identifier, "#file1," for the original file path of foo.c, which is used to uniquely identify the file. The second line specifies an attribute of foo.c using the defined identifier "#file1." The attribute in this example is the number of lines of source code in foo.c. The third line defines an identifier, "#file2" for the original file path of common.h, which is used to uniquely identify the file. The fourth line specifies an attribute of common.h using the defined identifier "#file2." The attribute of common.h is a number of lines of source code in common.h. In this example, the artifact represents that foo.c has 500 lines of source code and that common.h has 1000 lines of source code.

Continuing the illustrative example, another file, bar.c, may be modified or added to the project, and the system can receive a request to perform an incremental analysis in a second working directory/working/directory/two. Since the files foo.c and common.h have not been modified, the analysis artifact generated for foo.c, ANALYSIS ARTI-FACT 1 presented above, will not be regenerated. However, the incremental analysis produces a second analysis artifact having the following information:

ANALYSIS ARTIFACT 2
file1=@"/working/directory/two/bar.c"
numlines(#file1, 700)
file2=@"/working/directory/two/common.h"
numlines(#file2, 1000)

The first line defines an identifier, "#file1" for the original file path of bar.c, which is used to uniquely identify bar.c. The second line specifies an attribute, a number of lines of source code, of bar.c using the defined identifier "#file1." The third line defines an identifier, "#file2" for the original file path of common.h, which is used to uniquely identify the file common.h. The fourth line specifies an attribute, a number of lines of source code, of common.h using the defined identifier "#file2." In this example, the analysis artifact represents that bar.c has 700 lines of source code and that common.h has 1000 lines of source code.

The file common.h is therefore represented by two different original file paths in two different analysis artifacts. In other words, without considering normalized file paths, the system might consider the file common.h referenced in the first analysis artifact to be a different file than the file common.h referenced in the second analysis artifact. Therefore, when generating aggregated attributes about the project, e.g., using a database constructed from these two analysis artifacts, the system may determine that the number of lines in the project is 500+1000+700+1000=3200, which is 1000 too many because the lines of the file common.h have been counted twice for both file identities/working/directory/one/common.h and/working/directory/two/common.h.

The system can thus use file path transformation to transform the multiple different original file paths of common.h into a normalized space. Doing so will result in all identifiers for common.h having the same normalized file path. Furthermore, the file path transformations will result in references to all ancestors of common.h being normalized as well. In other words, the original file path represents a location in a file system space that is particular to a directory tree or to an individual machine, while the normalized file path represents a location in a normalized space that does not necessarily correspond to an actual location in any particular file system. In fact, some of the directories represented by a normalized file path may not have any counterparts in any file system or machine of the build system.

But first, the system can resolve symbolic links in the original file paths so that all original file paths can be coherently transformed into the normalized space.

The system obtains one or more user-specified symbolic-link resolution criteria (204). Before normalizing file paths, the system can resolve symbolic links in the original file paths. Resolving a symbolic link means replacing a link in an original file path with the actual destination to which the link points. Doing so can ensure that original file paths that identify a same location in a file system, but which are different because one of them has a symbolic link, will be normalized to the same normalized file path.

However, in some cases, fully resolving all symbolic-links may be problematic. For example, a content-addressable storage systems store files having filenames that are automatically generated based on the contents of the files themselves. Fully resolving symbolic links in a content-addressable storage system can cause resulting analysis artifacts to file names that are not meaningful to a user, e.g., a filename that is a hash of the file's contents.

Thus, the system can allow a user to specify one or more symbolic-link resolution criteria in order to ensure that a file path having a symbolic-link is only resolved if the resulting file path satisfies the one or more symbolic-link resolution criteria. Examples of symbolic link resolution criteria will described in more detail below with reference to FIG. 4.

The system obtains one or more user-specified file path transformation functions (206). The user-specified file path transformation functions specify how to transform an original file path that specifies a location in a file system to a normalized path that specifies a location in a normalized space. The file path transformation functions can include file path patterns and associated transformations to be performed on an original file path when the file path matches a particular pattern. For example, the transformations can include prepending strings or omitting one or more working directory names of a file system.

In some cases, when analysis artifacts are being generated, each time a file path is processed, the system matches the patterns in the file path transformation function to the original file path. If the pattern matches, the system can apply the associated transformation to the file path.

In some cases, a transformation may also specify that part or all of the matched file path be stripped away. As an illustrative example, a user-specified file path pattern and associated transformation function may be specified by the following:

normalized/path
/working/directory/*//

The second line specifies the pattern to be matched, e.g., any file path that is a direct subdirectory of "/working/directory/". The first line specifies a transformation. In this example, the transformation normalizes the file path by removing "/working/directory/<subdirectory>" and by replacing it with "normalized/path."

The system performs symbolic-link resolution according to the user-specified link resolution criteria (208). Performing symbolic-link resolution according to the user-specified symbolic-link resolution criteria is described in more detail below with reference to FIG. 4.

The system generates one or more normalized analysis artifacts for the collection of source code files including applying a file path transformation function to the original file path of each source code file referenced by the analysis artifacts (210). For each reference to a source code file within an analysis artifact, the system will apply the one or more user-specified transformation functions to replace the original file path with a normalized file path.

For example, continuing the example above, using the transformation function described above with reference to step 206, the file path for the file foo.c would be normalized to /normalized/path/foo.c. The file path for the file common.h would be normalized to /normalized/path/common.h. The file path for the file bar.c would be normalized to /normalized/path/bar.c.

Thus, the first normalized analysis artifact generated by the system using the normalized file paths would have the following information:
NORMALIZED ANALYSIS ARTIFACT 1
file1=@"/normalized/path/foo.c"
numlines(#file1, 500)
file2=@"/normalized/path/common.h"
numlines(#file2, 1000)

The second normalized analysis artifact generated by the system for the normalized file paths would be specified by the following:

NORMALIZED ANALYSIS ARTIFACT 2
file1=@"/normalized/path/bar.c"
numlines(#file1, 700)
file2=@"/normalized/path/common.h"
numlines(#file2, 1000)

The file common.h is therefore represented by the same normalized file path in both normalized analysis artifacts, i.e. /normalized/path/common.h.

In addition, two files that had different original parent directories according to the original file paths now have a same normalized parent directory according to the normalized file paths. In other words, according to the original file paths, foo.c and bar.c occur in different directories. But according to the normalized file paths, foo.c and bar.c occur in the same directory.

By using normalized file paths when generating the analysis artifacts, the system also preserves the semantic information in the original file paths, but in the normalized space. In other words, every reference to a file or a directory in the original file path is converted to an equivalent reference to a file or a directory in the normalized space.

For example, some analysis artifacts encode information about the directory tree of the project. The system will preserve, in the normalized space, such semantic information that encodes the relationships between file system paths and the directory structure. The following example artifact includes information about a directory structure using original file paths:

file1=@"/working/directory/one/foo.c"
filename(#file1, "foo.c")
dir1=@"/working/directory/one"
dirname(#dir1, "one")
parent(#dir1, #file1)
dir2=@"/working/directory"
dirname(#dir2, "directory")
parent(#dir2, #dir1)
dir3=@"/working"
dirname(#dir3, "working")
parent(#dir3, #dir2)

The first line defines an identifier, "#file1," for the file foo.c. The second line specifies a filename for the file foo.c. The third line defines an identifier, "#dir1," for the directory /working/directory/one that contains foo.c. The fourth line uses the identifiers "#file1" and "#dir1" to specify that the parent directory of foo.c is /working/directory/one. The rest of the artifact similarly defines identifiers for respective parent directories and specifies which directories are parent directories of other directories.

When generating normalized analysis artifacts, it is important that such semantic information be preserved. Thus, the system can generate the following example normalized artifact that represents the same semantic information but in the normalized space:

file1=@"/normalized/path/foo.c"
filename(#file1, "foo.c")
dir1=@"/normalized/path"
dirname(#dir1, "path")
parent(#dir1, #file1)
dir2=@"/normalized"
dirname(#dir2, "normalized")
parent(#dir2, #dir1)

In the normalized space, there are only two parent directories of foo.c, whereas according to the original file path of foo.c there were three. Furthermore, the locations /normalized and /normalized/path in the normalized space may not correspond to any actual locations in a file system.

The system can use the generated normalized analysis artifacts to coherently generate a database that records attributes of various portions of the code base, or otherwise present coherent results to the user. Because the normalized artifacts were generated using normalized file paths, different artifacts that were generated in different locations or file systems can be coherently combined. For example, artifacts generated in different original source trees, different analysis runs, and on different machines can be coherently combined regardless of the particulars of the original file paths of the files from which the artifacts were generated.

Thereafter, the system can use the normalized analysis artifacts to obtain attributes of the code base. Because the normalized artifacts had normalized file paths, the attributes will not suffer from double counting errors as described above. In particular, a database generated from normalized artifacts will contain only a single representation of attributes for each unique normalized file path.

Figure 3:
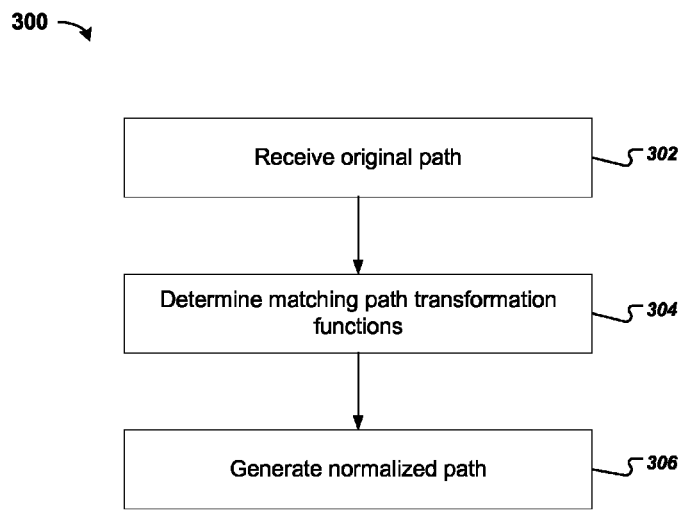
FIG. 3 is a flowchart of an example process for generating a normalized file path.

FIG. 3 is a flow chart of an example process 300 for generating a normalized file path. The process can be performed by a static analysis system, e.g., the file path normalizer 124 of the static analysis system 102 of FIG. 1. The process will be described as being performed by an appropriately programmed system of one or more computers.

The system receives an original file path (302). As described above with reference to FIG. 2, the original file path may be associated with a respective source code file in a collection of source code files. For example, the system may receive a file path such as /working/directory/one/foo.c. In some implementations, the system may provide the original file path to a symbolic link resolver in order to resolve any symbolic link components of the original file path, as described below with reference to FIG. 4.

The system determines matching file path transformation functions (304). As described above with reference to FIG. 2, the system may obtain one or more user-specified file path transformation functions and determine matching file path transformation functions from the one or more user-specified file path transformation functions. The file path transformation functions may specify file path patterns and associated transformations, and provide a method for unambiguously identifying how to transform file paths that meet a certain pattern into a normalized file path. For example, the system may determine that the path transformation function
 #normalized/path
 /working/directory/*//
matches the file path /working/directory/one/foo.c for the file foo.c.

The system generates a normalized file path (306). For example, the system may match the patterns in the file path transformation functions determined in step 304 above against the file path, and determine an associated transformation, e.g., prepend a specified string to the file path, or strip away part or all of the match file path, as specified by the corresponding matching one or more file path transformation functions. For example, the system may generate a normalized file path by considering the file path /working/directory/one/foo.c that starts with the directory/working/directory to be normalized by removing /working/directory/<subdirectory> and replacing it by normalized/path, e.g., generating the normalized file path normalized/path/foo.c. Generating a normalized file path may be performed after a file path has been made canonical, that is after the file path has been made absolute and had any symbolic links resolved. Resolving file paths is described in more detail below with reference to FIG. 4.

Figure 4:
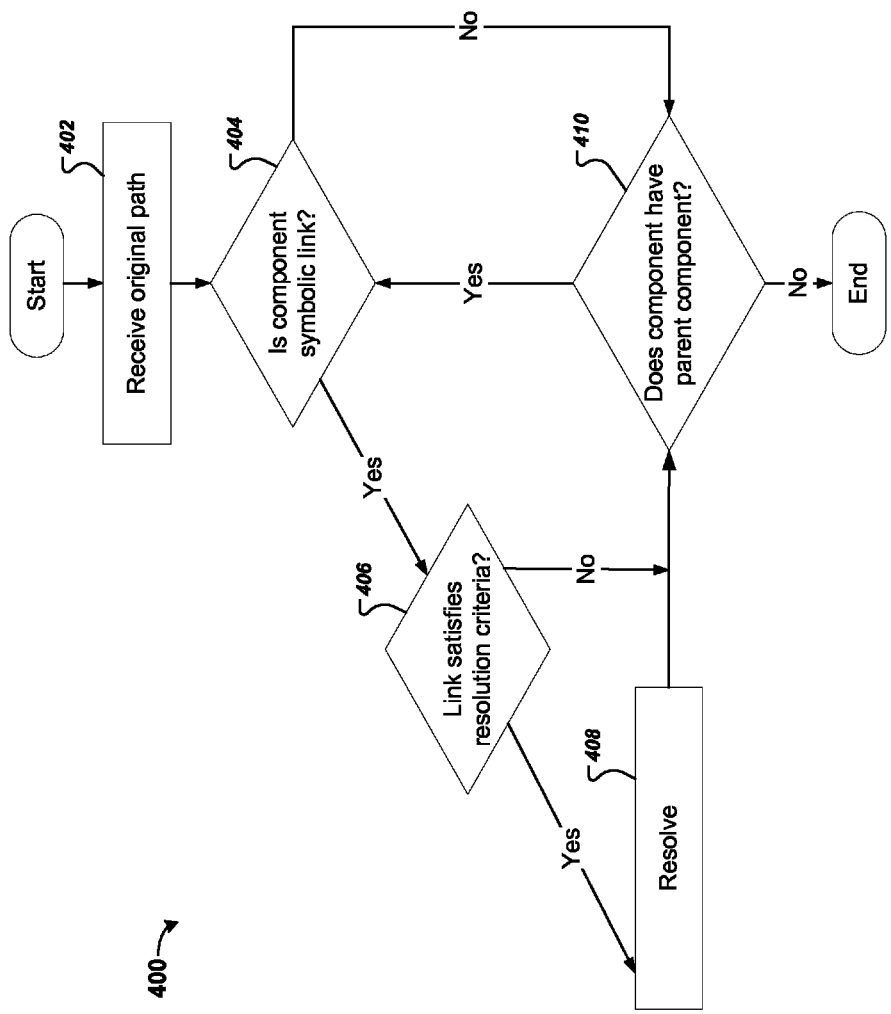
FIG. 4 is a flowchart of an example process for resolving a file path.

FIG. 4 is a flow chart of an example process 400 for resolving a file path. The process can be performed by a static analysis system, e.g., the symbolic link resolver 122 of the static analysis system 102 of FIG. 1. The process will be described as being performed by an appropriately programmed system of one or more computers.

The system receives an original file path of a source code file (402). The original file path may include one or more file path components, for example that are arranged from bottom to top where the immediate top component for a respective bottom component is a parent component of the bottom component.

The system determines whether a component of the original file path is a symbolic link (404). For example, the system may select the lowest component of the original file path and determine whether this lowest component is a symbolic link.

If the system determines that the component of the original file path is a symbolic link, the system determines whether the symbolic link satisfies one or more user-specified resolution criteria (406). The user-specified resolution criteria specify when to resolve a symbolic link in an original file path.

For example, one example criterion is that the symbolic link should not be resolved if the target of the link is a computer-generated filename, e.g., a filename generated by a content-addressable storage system. Another example criterion is that symbolic links should only be resolved if the target of the symbolic link is a directory rather than a file. A further example criterion is that a symbolic link should only be resolved if the target of the symbolic link is or is not included within a particular user-specified directory, e.g., a particular checkout or working directory of a build.

If the system determines that the symbolic link satisfies the user-specified resolution criteria, the system resolves the symbolic link and generates a resolved path component for the component of the original file path (408). In some implementations, determining that the symbolic link satisfies the resolution criteria includes determining that the original path component does not identify a file on a content-addressable file system. In other implementations, determining that the symbolic link satisfies the resolution criteria includes determining that the symbolic link is a link to a directory. In further implementations, determining that the symbolic link satisfies the resolution criteria includes determining that the symbolic link identifies a path that matches a portion of a checkout root directory.

If the system determines that the symbolic link does not satisfy the user-specified resolution criteria, the system determines whether the component of the original file path has a parent component (410). Similarly, if the system determines that the symbolic link does satisfy the user-specified resolution criteria and resolves the symbolic link, the system determines whether the component of the original file path has a parent component (410).

If the system determines that the component of the original file path does not have a parent component, the process terminates. Upon termination, the resolved file path may be provided for file path normalization, as described above with reference to FIG. 3.

The system determines whether the parent component of the previously considered component of the original file path is a symbolic link (404). The system repeats the steps (404)-(410) described above as appropriate, e.g., for each of the one or more components of the original file path from a filename component of the original path to each parent component of the original file path, until the termination criteria described above with reference to step (410) are met. Upon terminating the process 400, the system has resolved each symbolic link in the received original file path. In some implementations, the resolved file path may be provided for file path normalization, as described above with reference to FIG. 3.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments of the attached embodiments and the embodiments described above, the following embodiments are also innovative:

Embodiment 1 is a method comprising:
receiving a request to perform an analysis of a collection of source code files in a particular file system, wherein each source code file in the particular file system has a respective associated original file path; and
generating one or more normalized analysis artifacts for the collection of source code files, including applying a file path transformation function to the original file path of each source code file referenced by the analysis artifacts to generate a normalized file path for the source code file,
wherein each reference in the one or more normalized analysis artifacts to a particular source code file uses the normalized file path for the particular source code file instead of the original file path for the particular source code file.

Embodiment 2 is the method of embodiment 1, wherein multiple files that have different original parent directories according to respective original file paths of the multiple files have a same normalized parent directory according to respective normalized file paths of the multiple files.

Embodiment 3 is the method of embodiment 2, wherein the multiple files are located on different machines.

Embodiment 4 is the method of embodiment 2, wherein the multiple files are located in different working directories.

Embodiment 5 is the method of any one of embodiments 2-4, wherein the normalized parent directory path does not correspond to a directory that exists in the file system.

Embodiment 6 is the method of any one of embodiments 2-5, wherein the multiple files are multiple instances of a same first source code file, and wherein the one or more normalized analysis artifacts reference the multiple instances of the first source code file by a same normalized file path.

Embodiment 7 is the method of any one of embodiments 2-6, wherein the request to perform an analysis is a request to perform a current analysis subsequent to a previous analysis, and wherein the multiple files include one or more files analyzed during the previous analysis and one or more files analyzed during the current analysis.

Embodiment 8 is the method of embodiment 7, wherein one or more current normalized analysis artifacts generated from the current analysis and one or more previous normalized analysis artifacts generated from the previous analysis each reference a same source code file in the collection of source code files according to a same normalized file path.

Embodiment 9 is the method of any one of embodiments 7-8, wherein the current analysis is an incremental analysis in which analysis artifacts are generated only for source code files that have changed since a previous analysis.

Embodiment 10 is the method of any one of embodiments 1-9, further comprising generating a database using the one or more normalized analysis artifacts for the source code files.

Embodiment 11 is the method of embodiment 10, wherein one or more of the normalized analysis artifacts used to generate the database were generated in different directory trees, on different machines, or from different analysis runs.

Embodiment 12 is the method of any one of embodiments 10-11, further comprising generating no more than one database record for each unique normalized file path.

Embodiment 13 is the method of any one of embodiments 1-12, further comprising:
determining that a first original file path of a first source code file includes a symbolic link;
determining that the symbolic link satisfies one or more resolution criteria, wherein the one or more resolution criteria specify when to resolve a symbolic link in an original file path; and
in response, resolving the symbolic link to generate a resolved file path for the first source code file.

Embodiment 14 is the method of embodiment 13, wherein determining that the symbolic link satisfies one or more resolution criteria comprises determining that the original file path does not identify a file in a content-addressable file system.

Embodiment 15 is the method of any one of embodiments 13-14, wherein determining that the symbolic link satisfies one or more resolution criteria comprises determining that the symbolic link is a link to a directory.

Embodiment 16 is the method of any one of embodiments 13-15, wherein determining that the symbolic link satisfies one or more resolution criteria comprises determining that the symbolic link is a link to a user-specified directory.

Embodiment 17 is the method of any one of embodiments 13-16, wherein determining that the symbolic link satisfies one or more resolution criteria comprises determining that the symbolic link identifies a file path that matches a portion of a checkout root directory.

Embodiment 18 is the method of any one of embodiments 13-17, further comprising:
evaluating each of multiple components of the original file path from a filename component of the original file path to each parent component of the original file path.

Embodiment 19 is a method comprising
receiving a request to perform an analysis of a collection of source code files, wherein each source code file has a respective associated original file path;
determining that a first original file path of a first source code file includes a symbolic link;
determining that the symbolic link satisfies one or more resolution criteria, wherein the one or more resolution criteria specify when to resolve a symbolic link in an original file path;
in response, resolving the symbolic link to generate a resolved file path for the first source code file; and
generating an analysis artifact for the first source code file, including applying a file path transformation function to the resolved file path of the first source code file to generate a normalized file path for the first source code file, wherein the analysis artifact includes one or more attributes for the first source code file and references the first source code file by the normalized file path for the first source code file.

Embodiment 20 is the method of embodiment 19, wherein determining that the symbolic link satisfies one or more resolution criteria comprises determining that the original file path does not identify a file in a content-addressable file system.

Embodiment 21 is the method of any one of embodiments 19-20, wherein determining that the symbolic link satisfies one or more resolution criteria comprises determining that the symbolic link is a link to a directory.

Embodiment 22 is the method of any one of embodiments 19-21, wherein determining that the symbolic link satisfies one or more resolution criteria comprises determining that the symbolic link is a link to a user-specified directory.

Embodiment 23 is the method of any one of embodiments 19-22, wherein determining that the symbolic link satisfies one or more resolution criteria comprises determining that the symbolic link identifies a file path that matches a portion of a checkout root directory.

Embodiment 24 is a system comprising: one or more computers and one or more storage devices storing instructions that are operable, when executed by the one or more computers, to cause the one or more computers to perform the method of any one of embodiments 1 to 23.

Embodiment 25 is a computer storage medium encoded with a computer program, the program comprising instructions that are operable, when executed by data processing apparatus, to cause the data processing apparatus to perform the method of any one of embodiments 1 to 23.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request to perform an analysis of a collection of source code files in one or more particular file systems, wherein each source code file in each particular file system has a respective associated original file path, and wherein at least two source code files have different respective original parent directories according to respective original file paths of the two source code files;
generating one or more normalized analysis artifacts for the collection of source code files, including applying a file path transformation function to the original file path of each source code file referenced by the analysis artifacts to generate a normalized file path for the source code file, wherein the two source code files having different respective original parent directories have a same normalized parent directory according to respective normalized file paths of the two source code files,
wherein each reference, in the one or more normalized analysis artifacts, to a particular source code file uses the normalized file path for the particular source code file instead of the original file path for the particular source code file; and
computing, from the one or more normalized analysis artifacts, one or more source code attributes for one or more of the source code files in response to the request.

2. The method of claim 1, wherein the two source code files have different original file paths and a same normalized file path, and
wherein computing, from the one or more normalized analysis artifacts, one or more source code attributes for one or more of the source code files comprises computing a single representation of source code attributes for the normalized file path of the two source code files.

3. The method of claim 2, wherein the two source code files are multiple instances of a same first source code file, and wherein the one or more normalized analysis artifacts reference the multiple instances of the first source code file by a same normalized file path.

4. The method of claim 1, wherein the two source code files are located on different machines.

5. The method of claim 1, wherein the two source code files having the same normalized parent directory are located in different working directories on a same machine.

6. The method of claim 1, wherein the normalized parent directory does not represent a directory that exists in the file system.

7. The method of claim 1, wherein the request to perform an analysis is a request to perform a current analysis subsequent to a previous analysis, and wherein the two source code files include one or more files analyzed during the previous analysis and one or more files analyzed during the current analysis.

8. The method of claim 7, wherein one or more current normalized analysis artifacts generated from the current analysis and one or more previous normalized analysis artifacts generated from the previous analysis each reference a same source code file in the collection of source code files according to a same normalized file path.

9. The method of claim 7, wherein the current analysis is an incremental analysis in which analysis artifacts are generated only for source code files that have changed since a previous analysis.

10. The method of claim 1, further comprising:
generating a database using the one or more normalized analysis artifacts for the source code files.

11. The method of claim 10, wherein one or more of the normalized analysis artifacts used to generate the database were generated in different directory trees, on different machines, or from different analysis runs.

12. The method of claim 10, further comprising generating no more than one database record for each unique normalized file path.

13. The method of claim 1, further comprising:
determining that a first original file path of a first source code file includes a symbolic link;
determining that the symbolic link satisfies one or more resolution criteria, wherein the one or more resolution criteria specify when to resolve a symbolic link in an original file path; and
in response, resolving the symbolic link to generate a resolved file path for the first source code file.

14. The method of claim 13, wherein determining that the symbolic link satisfies one or more resolution criteria comprises determining that the original file path does not identify a file in a content-addressable file system.

15. The method of claim 13, wherein determining that the symbolic link satisfies one or more resolution criteria comprises determining that the symbolic link is a link to a directory.

16. The method of claim 13, wherein determining that the symbolic link satisfies one or more resolution criteria comprises determining that the symbolic link is a link to a user-specified directory.

17. The method of claim 13, wherein determining that the symbolic link satisfies one or more resolution criteria comprises determining that the symbolic link identifies a file path that matches a portion of a checkout root directory.

18. The method of claim 13, further comprising:
evaluating each of multiple components of the original file path from a filename component of the original file path to each parent component of the original file path.

19. A system comprising:
one or more computers and one or more storage devices storing instructions that are operable, when executed by the one or more computers, to cause the one or more computers to perform operations comprising:
receiving a request to perform an analysis of a collection of source code files in one or more particular file systems, wherein each source code file in each particular file system has a respective associated original file path, and wherein at least two source code files have different respective original parent directories according to respective original file paths of the two source code files;
generating one or more normalized analysis artifacts for the collection of source code files, including applying a file path transformation function to the original file path of each source code file referenced by the analysis artifacts to generate a normalized file path for the source code file, wherein the two source code files having different respective original parent directories have a same normalized parent directory according to respective normalized file paths of the two source code files,
wherein each reference, in the one or more normalized analysis artifacts, to a particular source code file uses the normalized file path for the particular source code file instead of the original file path for the particular source code file; and
computing, from the one or more normalized analysis artifacts, one or more source code attributes for one or more of the source code files in response to the request.

20. The system of claim 19, wherein the two source code files have different original file paths and a same normalized file path, and
wherein computing, from the one or more normalized analysis artifacts, one or more source code attributes for one or more of the source code files comprises computing a single representation of source code attributes for the normalized file path of the two source code files.

21. The system of claim 20, wherein the two source code files are multiple instances of a same first source code file, and wherein the one or more normalized analysis artifacts reference the multiple instances of the first source code file by a same normalized file path.

22. The system of claim 19, wherein the two source code files are located on different machines.

23. The system of claim 19, wherein the two source code files having the same normalized parent directory are located in different working directories on a same machine.

24. The system of claim 19, wherein the normalized parent directory does not represent a directory that exists in the file system.

25. The system of claim 19, wherein the request to perform an analysis is a request to perform a current analysis subsequent to a previous analysis, and wherein the two source code files include one or more files analyzed during the previous analysis and one or more files analyzed during the current analysis.

26. The system of claim 25, wherein one or more current normalized analysis artifacts generated from the current analysis and one or more previous normalized analysis artifacts generated from the previous analysis each reference a same source code file in the collection of source code files according to a same normalized file path.

27. The system of claim 25, wherein the current analysis is an incremental analysis in which analysis artifacts are generated only for source code files that have changed since a previous analysis.

28. The system of claim 19, wherein the operations further comprise:
generating a database using the one or more normalized analysis artifacts for the source code files.

29. The system of claim 28, wherein one or more of the normalized analysis artifacts used to generate the database were generated in different directory trees, on different machines, or from different analysis runs.

30. The system of claim 28, wherein the operations further comprise generating no more than one database record for each unique normalized file path.

31. The system of claim 19, wherein the operations further comprise:
determining that a first original file path of a first source code file includes a symbolic link;
determining that the symbolic link satisfies one or more resolution criteria, wherein the one or more resolution criteria specify when to resolve a symbolic link in an original file path; and
in response, resolving the symbolic link to generate a resolved file path for the first source code file.

32. The system of claim 31, wherein determining that the symbolic link satisfies one or more resolution criteria comprises determining that the original file path does not identify a file in a content-addressable file system.

33. The system of claim 31, wherein determining that the symbolic link satisfies one or more resolution criteria comprises determining that the symbolic link is a link to a directory.

34. The system of claim 31, wherein determining that the symbolic link satisfies one or more resolution criteria comprises determining that the symbolic link is a link to a user-specified directory.

35. The system of claim 31, wherein determining that the symbolic link satisfies one or more resolution criteria comprises determining that the symbolic link identifies a file path that matches a portion of a checkout root directory.

36. The system of claim 31, wherein the operations further comprise:

evaluating each of multiple components of the original file path from a filename component of the original file path to each parent component of the original file path.

37. A computer program product, encoded on one or more non-transitory computer storage media, comprising instructions that when executed by one or more computers cause the one or more computers to perform operations comprising:

receiving a request to perform an analysis of a collection of source code files in one or more particular file systems, wherein each source code file in each particular file system has a respective associated original file path, and wherein at least two source code files have different respective original parent directories according to respective original file paths of the two source code files;

generating one or more normalized analysis artifacts for the collection of source code files, including applying a file path transformation function to the original file path of each source code file referenced by the analysis artifacts to generate a normalized file path for the source code file, wherein the two source code files having different respective original parent directories have a same normalized parent directory according to respective normalized file paths of the two source code files, wherein each reference, in the one or more normalized analysis artifacts, to a particular source code file uses the normalized file path for the particular source code file instead of the original file path for the particular source code file; and computing, from the one or more normalized analysis artifacts, one or more source code attributes for one or more of the source code files in response to the request.

* * * * *